US 8,949,991 B2
Feb. 3, 2015

(12) United States Patent
Beskrovny et al.

(54) TESTING WEB SERVICES THAT ARE ACCESSIBLE VIA SERVICE ORIENTED ARCHITECTURE (SOA) INTERCEPTORS

(75) Inventors: Evgeny Beskrovny, Ramat Gan (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 13/016,813

(22) Filed: Jan. 28, 2011

(65) Prior Publication Data
US 2012/0198555 A1    Aug. 2, 2012

(51) Int. Cl.
*G06F 11/00* (2006.01)
*G06F 21/00* (2013.01)

(52) U.S. Cl.
CPC ........................ *G06F 21/00* (2013.01)
USPC ........................................................ 726/25

(58) Field of Classification Search
None
See application file for complete search history.

(56) References Cited

U.S. PATENT DOCUMENTS

| | | | |
|---|---|---|---|
| 7,222,121 B2* | 5/2007 | Casati et al. ........................... 1/1 |
| 7,313,564 B2* | 12/2007 | Melamed et al. ............. 717/124 |
| 7,849,448 B2* | 12/2010 | Yunus et al. ................... 717/126 |
| 8,621,639 B1* | 12/2013 | Pennington et al. ............ 726/25 |
| 2004/0128650 A1* | 7/2004 | Chamberlain ................. 717/124 |
| 2006/0023857 A1* | 2/2006 | Schneider et al. ........ 379/142.01 |
| 2006/0150246 A1* | 7/2006 | Kamada et al. ................. 726/17 |
| 2006/0277606 A1* | 12/2006 | Yunus et al. ..................... 726/25 |
| 2007/0220370 A1* | 9/2007 | Branda et al. .................... 714/49 |
| 2007/0268822 A1* | 11/2007 | Brunswig et al. ............. 370/229 |
| 2008/0256517 A1* | 10/2008 | Atkin et al. .................... 717/124 |
| 2009/0172012 A1* | 7/2009 | Chellam et al. ........... 707/103 R |
| 2009/0205047 A1* | 8/2009 | Podjarny .......................... 726/25 |
| 2009/0313639 A1* | 12/2009 | Davis et al. .................... 719/317 |
| 2010/0305986 A1* | 12/2010 | Ponnalagu et al. ................ 705/7 |
| 2011/0145924 A1* | 6/2011 | Kolsek et al. .................... 726/25 |
| 2011/0264964 A1* | 10/2011 | Murphy et al. .................. 714/48 |
| 2013/0212539 A1* | 8/2013 | Hebbar et al. ................. 715/854 |

OTHER PUBLICATIONS

Bryson (Brian Bryson, "Hello Worldk: IBM Rational Tester for SOA Quality Tesing Web services to ensure high-quality service-oriented architecture", IBMs Developer Works, May 2007).*
IPCOM000208558D.*
Singhal e tal. "Guide to Secure Web Services", NIST Special Publication 800-95, Aug. 2007.*
Balzarotti, D., M. Cova, V. Felmetsger, N. Jovanovic, E. Kirda, C. Kruegel, and G. Vigna, "Saner: Composing Static and Dynamic Analysis to Validate Sanitization in Web Applications", Proceedings of the 2008 IEEE Symposium on Security and Privacy, May 2008, 15 pp. (Also at URL: http://www.computer.org/portal/web/csdl/doi/10.1109/SP.2008.22).

(Continued)

*Primary Examiner* — Peter Poltorak
(74) *Attorney, Agent, or Firm* — Janaki K. Davda; Konrad, Raynes, Davda and Victor LLP (57) ABSTRACT

Systems, methods, and computer program products are disclosed for testing web service-related elements, where the instructions of a web service-related element are statically analyzed to identify a characteristic of an output of the web service-related element, and where it is determined from a received response to a web service request that the web service request was processed by the web service-related element if at least a portion of the response matches the characteristic of the output of the web service-related element.

21 Claims, 5 Drawing Sheets

(56) References Cited

OTHER PUBLICATIONS

Cobb, M., "Application Security Increased by Static and Dynamic Code Analysis", [online], May 2, 2006, [Retrieved on Feb. 15, 2011], retrieved from the Internet at <URL: http://searchsoftwarequality.techtarget.com/tip/0,289483,sid92_gci1186167,00.html>, 2 pp.

Di Lucca, G.A. and M. Di Penta, "Integrating Static and Dynamic Analysis to Improve the Comprehension of Existing Web Applications", Proceedings of the Seventh IEEE International Symposium on Web Site Evolution , 2005, 8 pp. (Also at URL http://portal.acm.org/citation.cfm?id=1092701).

IBM Corp., "Mapping White Box Issues to Black Box Entry Point Using Runtime Analysis", Technical Disclosure, IP.com No. IPCOM000186943D, Aug. 31, 2009, 4 pp.

Lam, M.S., M. Martin, B. Livshits, and J. Whaley, "Securing Web Applications with Static and Dynamic Information Flow Tracking", Proceedings of the 2008 ACM SIGPLAN symposium on Partial evaluation and semantics-based program manipulation, Jan. 2008, 10 pp. (Also at URL http://suif.stanford.edu/papers/pepm08.pdf).

Smaragdakis, Y. and C. Csallner, "Combining Static and Dynamic Reasoning for Bug Detection", 2007, 16 pp. (Also at URL: http://www.cs.umass.edu/~yannis/tap07.pdf).

* cited by examiner

```
[SecurityPermissionAttribute(SecurityAction.Demand,
Flags=SecurityPermissionFlag.UnmanagedCode)]
public class CustomUsernameTokenManager :
UsernameTokenManager
{
   // Returns the password or password equivalent for a user
name.
    protected override string
AuthenticateToken(UsernameToken token)
    {
        // Ensure the SOAP message contained a
UsernameToken.
        if (token == null)
            throw new ArgumentNullException("Token must not
be null!");

// This is a very simple provider.
        // In most production systems the following code
        // typically consults an external database to obtain
the password or
        // password equivalent for a given user name.

byte[] password =
System.Text.Encoding.UTF8.GetBytes(token.Username);
        Array.Reverse(password);

return Convert.ToBase64String(password);
    }
}
```

TESTING WEB SERVICES THAT ARE ACCESSIBLE VIA SERVICE ORIENTED ARCHITECTURE (SOA) INTERCEPTORS

BACKGROUND

The present invention relates to computer software analysis and testing in general.

Computer software applications are often tested to determine whether they are vulnerable to malicious attacks or otherwise show signs of security vulnerabilities. One such type of testing known as "black-box" testing involves executing a computer software application and attacking the application using known forms of malicious attacks. When performing black-box testing on a computer software application it is important to determine which part of the computer software application is vulnerable to a particular black-box attack. This is particularly challenging when performing black-box testing on web services, such as web services that expose one or more Application Programming Interfaces (APIs) that are accessible via Hypertext Transfer Protocol (HTTP) for execution on one or more computers, where the web services are accessible via a layer of one or more Service Oriented Architecture (SOA) interceptors. For example, where a black-box attack is intended to test a particular web service API for vulnerabilities, such as a web service API that contains business logic, the attack may first have to go through several layers of SOA-related interceptors, such as those that are related to authentication, authorization, session management, etc. Thus, when a response is received to the black-box attack on a web service API, it is important to determine whether the attack indeed reached its intended target or whether the attack never made it past an intermediate web service request interceptor.

SUMMARY

In one aspect of the invention a method is provided for testing web service-related elements, the method including statically analyzing instructions of a web service-related element to identify a characteristic of an output of the web service-related element, receiving a response to a web service request, and determining that the web service request was processed by the web service-related element if at least a portion of the response matches the characteristic of the output of the web service-related element.

In other aspects of the invention one or more systems and computer program products are also provided.

BRIEF DESCRIPTION OF THE SEVERAL VIEWS OF THE DRAWINGS

The invention will be understood and appreciated more fully from the following detailed description taken in conjunction with the appended drawings in which.

DETAILED DESCRIPTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
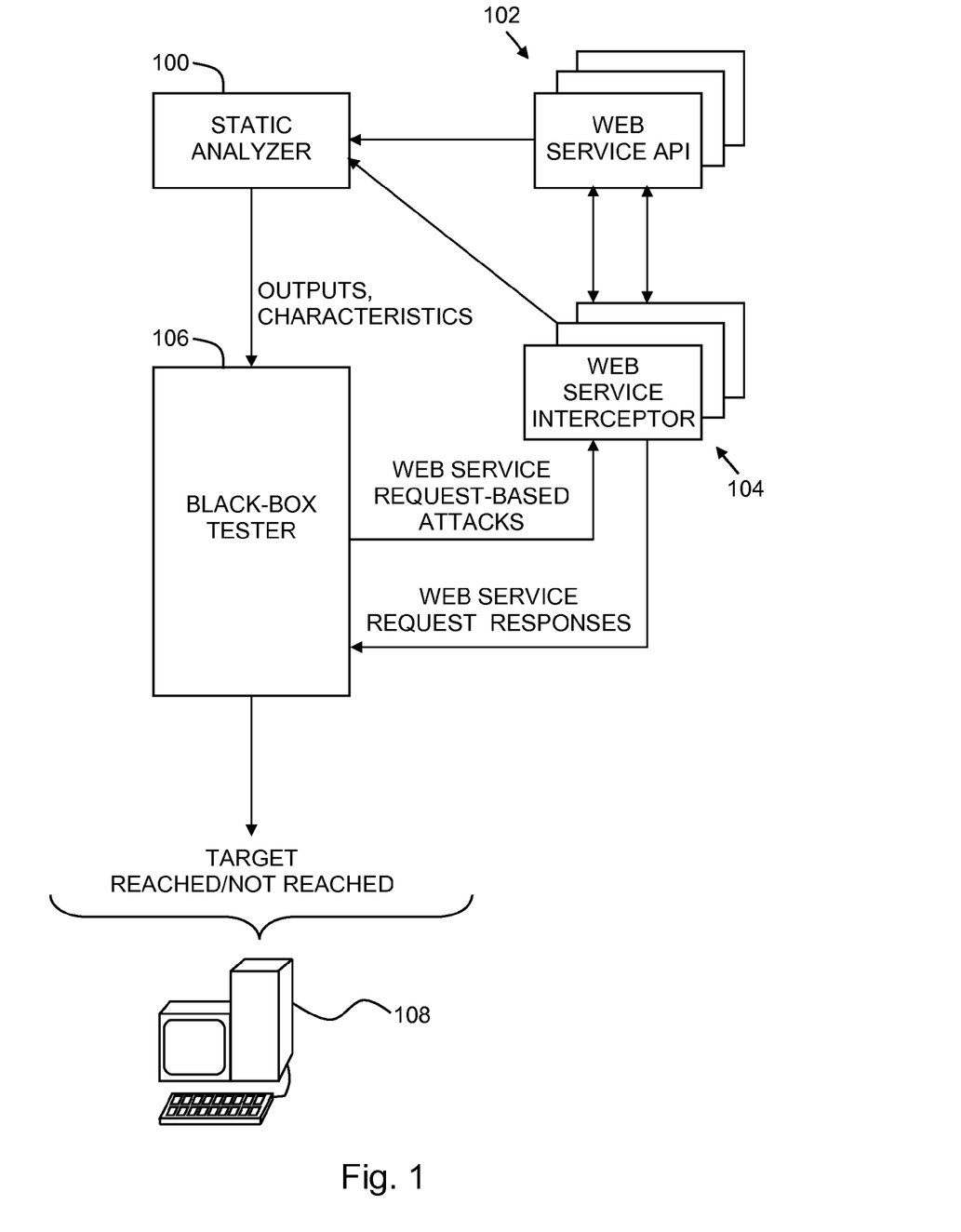
FIG. 1 is a simplified conceptual illustration of a system for testing web services that are accessible via Service Oriented Architecture (SOA) interceptors, constructed and operative in accordance with an embodiment of the invention.

Reference is now made to FIG. 1 which is a simplified conceptual illustration of a system for testing web services that are accessible via Service Oriented Architecture (SOA) interceptors, constructed and operative in accordance with an embodiment of the invention. In the system of FIG. 1, a static analyzer 100 is configured to statically analyze one or more web service APIs, generally designated 102, such as may be hosted by one or more computers accessible via a computer network (not shown). Web service APIs 102 may, for example, contain logic embodying the core functions of a business application. Static analyzer 100 is additionally or alternatively configured to statically analyze one or more SOA interceptors, generally designated 104, such as may be hosted by one or more computers accessible via a computer network (not shown). SOA interceptors 104 may be layered with respect to each other and to web service APIs 102, such as where web service APIs 102 logically reside on top of a layered stack of SOA interceptors 104, such as in the form of SOA handlers, related to authentication, authorization, and session management. Where SOA interceptors 104 are layered in this manner, a web services request that is intended by a requestor to be processed by a particular one of web service APIs 102 may first have to go through several layers of SOA interceptors 104. Web service APIs 102 and SOA interceptors 104 are collectively referred to herein as web service-related elements.

Static analyzer 100 is configured in accordance with conventional techniques to statically analyze one or more web service-related elements, such as where the instructions are in the form of source code or byte code, to identify the characteristics of one or more outputs of the web service-related elements, such as return values or exception values, as may be provided in response to a web service request. Such characteristics preferably include the conditions that give rise to a particular output, as well as the output value itself and/or a template thereof. Examples of such outputs and their characteristics that are identified by static analyzer 100 are described in greater detail hereinbelow with reference to FIG. 2.

A black-box tester 106 is shown in FIG. 1 and is configured to synthesize one or more attacks in accordance with conventional techniques using the output characteristics of one or more web service-related elements, such as those that are identified by static analyzer 100. In certain embodiments, the black-box tester 106 may be described as performing dynamic-analysis to build web service requests that are able to exercise different layers in the SOA and obtain validation signals. Black-box tester 106 preferably presents an attack in the form of a web service request in an attempt to reach a target web service-related element among the web service-related elements, such as where an attack is designed to test for security vulnerabilities in a particular one of web service APIs 102 that contains a particular business-related function. Black-box tester 106 is also preferably configured to receive a response to such a web service request-based attack, and to determine if the web service request was processed by the target web service-related element if at least a portion of the response matches the characteristics of any of the outputs of the target web service-related element, such as were previously identified by static analyzer 100. If no portion of the response matches the characteristics of any of the outputs of the target web service-related element, then the web service request most likely was not processed by the target web service-related element. Furthermore, if at least a portion of the response matches the characteristics of any of the outputs of a web service-related element other than the target web service-related element, then the web service request most likely was prevented by the non-target web service-related element from reaching the target web service-related element.

Any of the elements shown in FIG. 1 are preferably executed by or otherwise made accessible to a computer 108 such as by implementing any of the elements in computer hardware and/or in computer software embodied in a physically-tangible, non-transitory, computer-readable medium in accordance with conventional techniques.

Figure 2:
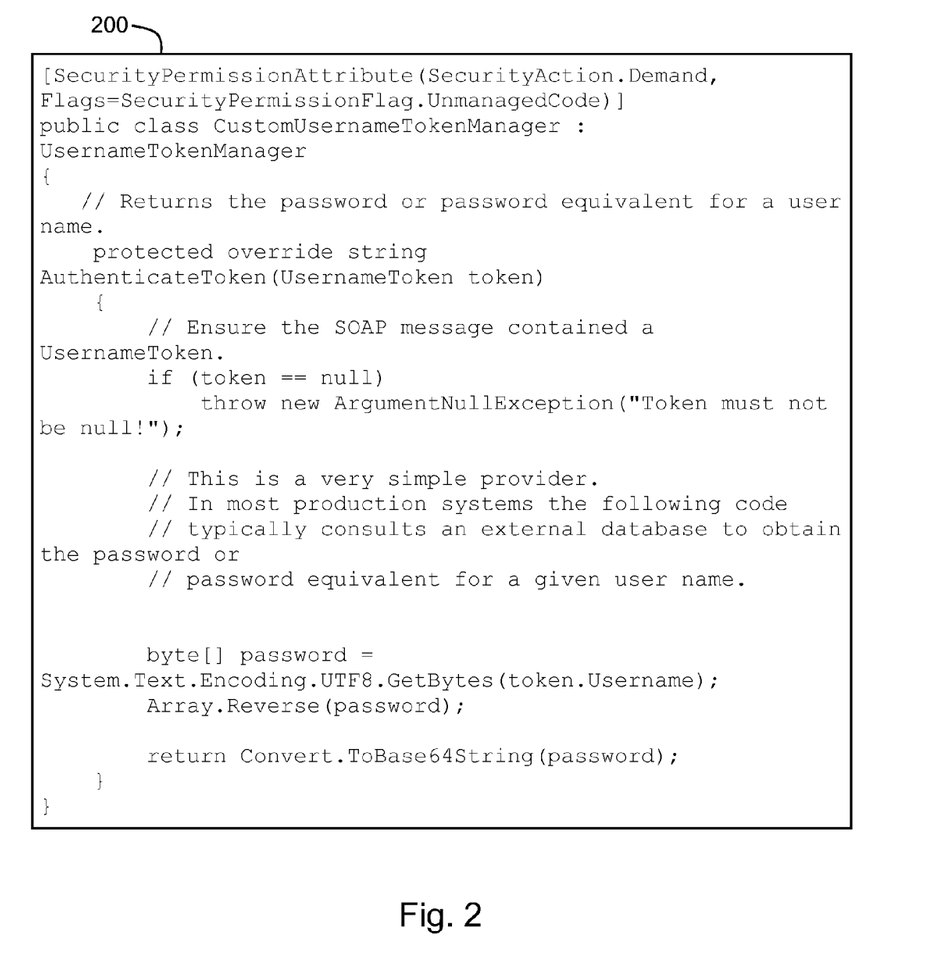
FIG. 2 is an example of user-name/token handler instructions of a web service API that provides security for peer authentication, useful in understanding the invention.

The operation of FIG. 1 is illustrated with reference to FIG. 2 which shows an example of user-name/token handler instructions 200 of a SOA interceptor that provides security for peer authentication. Static analyzer 100 determines that for the instructions to complete their task normally, a received token should not be empty, and a password should be found for a given user. Static analyzer 100 identifies the output text "Token should not be null!" as associated with an argument-null exception. Using this information, black-box tester 106 preferably synthesizes one or more web service requests using conventional techniques in an attempt to reach a target web service API by providing inputs that satisfy all necessary pre-conditions of any intermediate SOA interceptors like the SOA interceptor shown in FIG. 2, such as are identified by static analyzer 100. Black-box tester 106 determines whether a web service request reached its intended target web service API by analyzing a response to the web service request. Thus, if a response includes the message "Token should not be null!", black-box tester 106 determines that the web service request did not reach the target web service API, and was instead prevented from reaching the target web service API by the SOA interceptor shown in FIG. 2. Thus, the black-box tester 106 validates behavior of each layer based on observable indications of failure or success.

Figure 3:
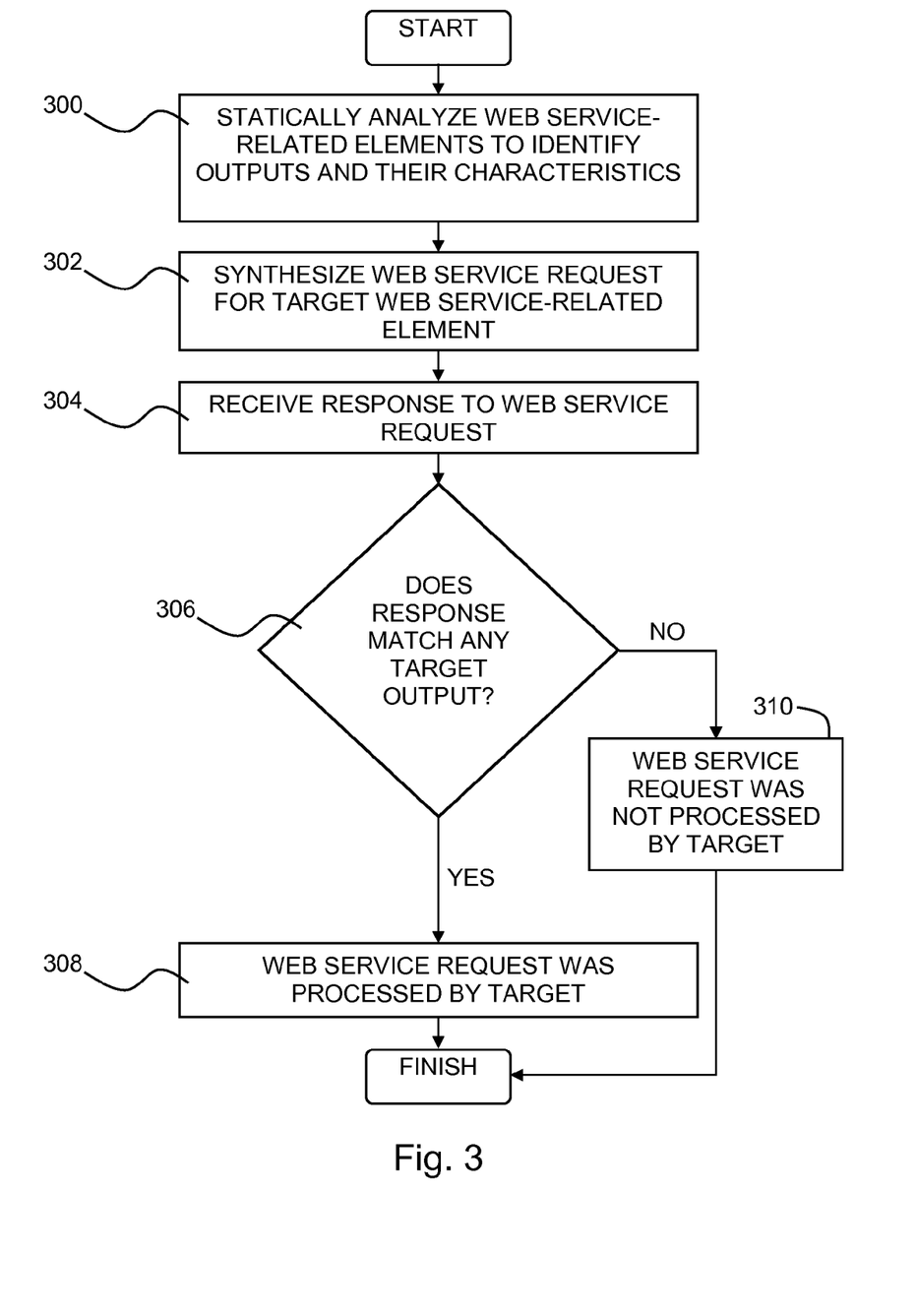
FIG. 3 is a simplified flowchart illustration of an exemplary method of operation of the system of FIG. 1, operative in accordance with an embodiment of the invention.

Reference is now made to FIG. 3 which is a simplified flowchart illustration of an exemplary method of operation of the system of FIG. 1, operative in accordance with an embodiment of the invention. In the method of FIG. 3, the instructions of one or more web service-related elements are statically analyzed to identify characteristics of one or more of their outputs (block 300). One or more web service requests are synthesized in an attempt to reach a target web service-related element among the statically analyzed web service-related elements (block 302). A response to a web service request is received (block 304). If at least a portion of the response matches the known characteristics of any of the outputs of the target (block 306), then it is determined that the web service request was processed by the target (block 308), which information may be presented via a computer output device, such as a computer display, otherwise, it is determined that the web service request was not processed by the target (block 310). After blocks 308 or 310, processing is finished.

Figure 4:
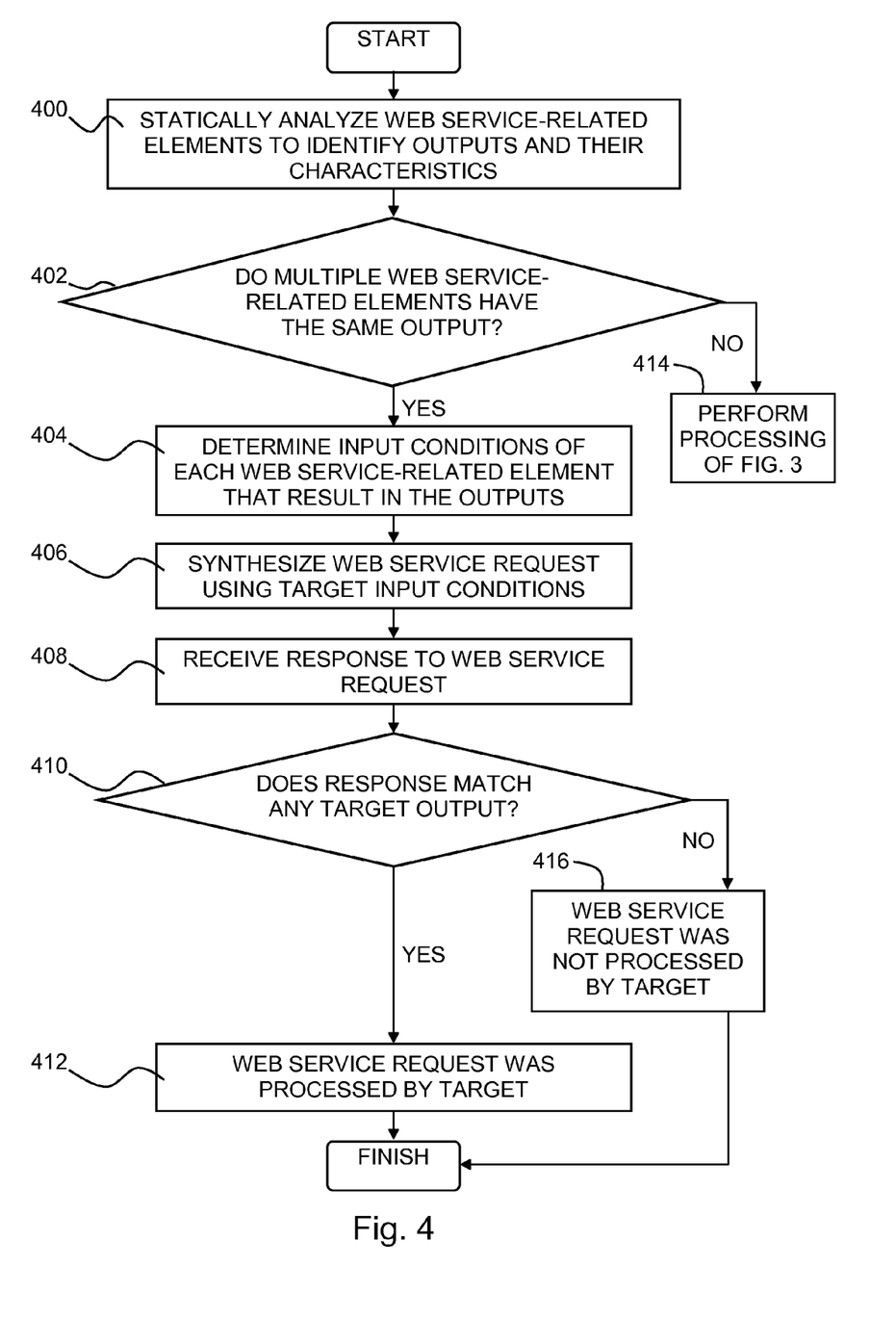
FIG. 4 which is a simplified flowchart illustration of an exemplary method of operation of the system of FIG. 1, operative in accordance with another embodiment of the invention.

Reference is now made to FIG. 4 which is a simplified flowchart illustration of an exemplary method of operation of the system of FIG. 1, operative in accordance with another embodiment of the invention. The method of FIG. 4 is substantially similar to the method of FIG. 3, but may be employed where different web service-related elements provide one or more of the same outputs, such as where two or more web service-related elements provide the same "ID is incorrect" message. In the method of FIG. 4, the instructions of one or more web service-related elements are statically analyzed to identify characteristics of one or more of their outputs (block 400). If two or more of the web service-related elements have an output that is the same (block 402), the input conditions that result in the outputs are determined (block 404), otherwise, the processing of FIG. 3 is performed (block 414). One or more web service requests are synthesized in accordance with the input conditions in an attempt to reach a target web service-related element among the statically analyzed web service-related elements (block 406). A response to a web service request is received (block 408). If at least a portion of the response matches the known characteristics of any of the outputs of the target (block 410), then it is determined that the web service request was processed by the target (block 412), which information may be presented via a computer output device, such as a computer display, otherwise, it is determined that the web service request was not processed by the target (block 416). After blocks 412 or 416, processing is finished.

Thus, for example, if static analysis determines that both an authentication SOA interceptor and a business transaction web service API return an "ID is incorrect" message, where the authentication SOA interceptor returns the "ID is incorrect" message if a received ID contains one or more letters, and where the business transaction web service API returns the "ID is incorrect" message if a received ID does not start with a letter, then this information may be used to formulate a web service request having the characteristics to trigger a response from the web service API rather than the SOA interceptor, whereupon the received response may be analyzed to determine whether or not the web service request reached the target web service API.

Figure 5:
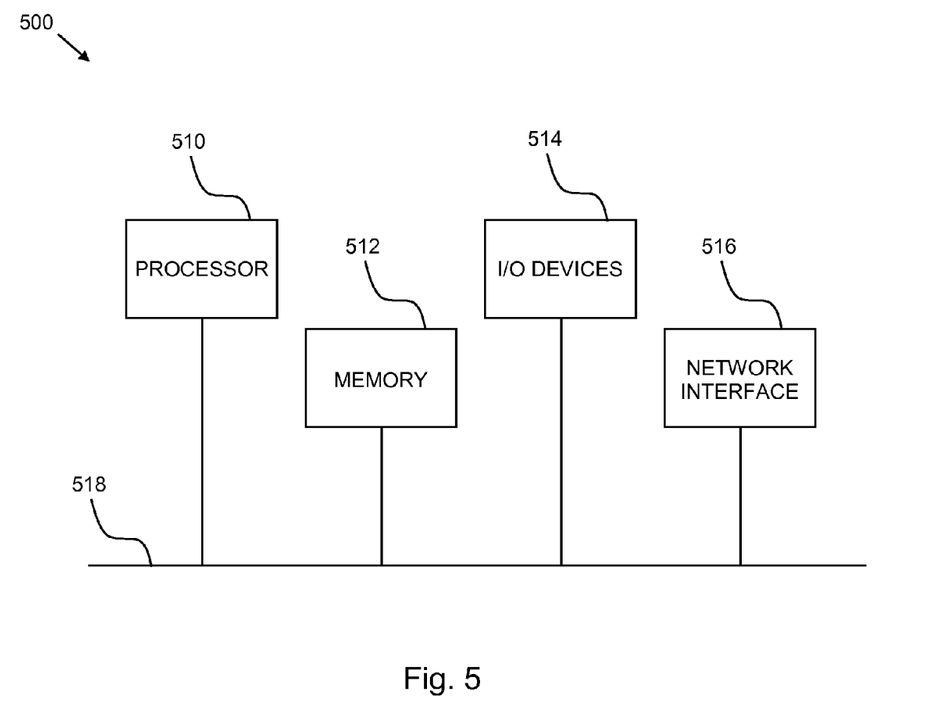
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should be also noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for testing web service-related elements, the method comprising:
   statically analyzing instructions of a plurality of web service-related elements, including a target web service-related element to identify a characteristic of an output of each web service-related element, wherein the target web service-related element is a web service exposed application programming interface (API);
   determining that at least two of the plurality of web service-related elements have a same output;
   in response to determining that at least two of the plurality of web service-related elements have the same output, determining an input condition for each of the at least two of the plurality of web service-related elements that results in the same output;
   synthesizing an attack on the target web service-related element using the characteristic of the same output of the target web service-related element and the input condition that results in the same output;
   presenting the attack in the form of a web service request to attempt to reach the target web service-related element through a plurality of other web-service related elements layered with respect to each other;
   receiving a response to the web service request sent to the target web service-related element through one or more of the other web-service related elements; and
   in response to determining that at least a portion of the response matches the characteristic of the output of the target web service-related element, determining that the web service request was processed by the target web service-related element.

2. The method according to claim 1 wherein statically analyzing comprises statically analyzing multiple web service-exposed application programming interfaces (APIs).

3. The method according to claim 1 wherein statically analyzing comprises statically analyzing the web service-exposed API that contains logic embodying a core function of a business application.

4. The method according to claim 1 wherein statically analyzing comprises statically analyzing a Service Oriented Architecture (SOA) interceptor that relates to one of authentication, authorization, and session management.

5. The method according to claim 1 wherein statically analyzing comprises statically analyzing the web service-exposed API and a Service Oriented Architecture (SOA) interceptor.

6. The method according to claim 1 wherein statically analyzing comprises identifying one of a return value and an exception value of the target web service-related element.

7. The method according to claim 1 and further comprising:
   in response to determining that at least a portion of the response matches a characteristic of output of an Service Oriented Architecture (SOA) interceptor from among the plurality of SOA interceptors, identifying the SOA interceptor from among the plurality of SOA interceptors as having prevented the web service request from reaching the target web service-related element.

8. A system for testing web service-related elements, the system comprising:
   a processor; and
   storage coupled to the processor, wherein the storage stores computer program instructions, wherein the computer program instructions, when executed by the processor, perform:
   statically analyzing instructions of a plurality of web service-related elements, including a target web service-related element to identify a characteristic of an output of each web service-related element, wherein the target web service-related element is a web service exposed application programming interface (API);
   determining that at least two of the plurality of web service-related elements have a same output;
   in response to determining that at least two of the plurality of web service-related elements have the same output, determining an input condition for each of the at least two of the plurality of web service-related elements that results in the same output;
   synthesizing an attack on the target web service-related element using the characteristic of the same output of the target web service-related element and the input condition that results in the same output;
   presenting the attack in the form of a web service request to attempt to reach the target web service-related element through a plurality of other web-service related elements layered with respect to each other;
   receiving a response to the web service request sent to the target web service-related element through one or more of the other web-service related elements; and
   in response to determining that at least a portion of the response matches the characteristic of the output of the target web service-related element, determining that the web service request was processed by the target web service-related element.

9. The system according to claim 8 wherein statically analyzing comprises statically analyzing multiple web service-exposed application programming interfaces (APIs).

10. The system according to claim 8 wherein statically analyzing comprises statically analyzing a web service-exposed API that contains logic embodying a core function of a business application.

11. The system according to claim 8 wherein statically analyzing comprises statically analyzing a Service Oriented Architecture (SOA) interceptor that relates to one of authentication, authorization, and session management.

12. The system according to claim 8 wherein statically analyzing comprises statically analyzing the web service-exposed API and a Service Oriented Architecture (SOA) interceptor.

13. The system according to claim 8 wherein statically analyzing comprises identifying one of a return value and an exception value of the target web service-related element.

14. The system according to claim 8, wherein the operations further comprise:
   in response to determining that at least a portion of the response matches a characteristic of output of an Service Oriented Architecture (SOA) interceptor from among the plurality of SOA interceptors, identifying the SOA interceptor from among the plurality of SOA interceptors as having prevented the web service request from reaching the target web service-related element.

15. A computer program product for testing web service-related elements, the computer program product comprising:

a computer-readable storage device; and computer-readable program code embodied in the computer-readable storage device, wherein the computer-readable program code is configured to:

statically analyze instructions of a plurality of web service-related elements, including a target web service-related element to identify a characteristic of an output of each web service-related element, wherein the target web service-related element is a web service exposed application programming interface (API);

determining that at least two of the plurality of web service-related elements have a same output;

in response to determining that at least two of the plurality of web service-related elements have the same output, determining an input condition for each of the at least two of the plurality of web service-related elements that results in the same output;

synthesizing an attack on the target web service-related element using the characteristic of the same output of the target web service-related element and the input condition that results in the same output;

presenting the attack in the form of the web service request to attempt to reach the target web service-related element through a plurality of other web-service related elements layered with respect to each other;

receive a response to the web service request sent to the target web service-related element through one or more of the other web-service related elements;

in response to determining that at least a portion of the response matches the characteristic of the output of the target web service-related element, determine that the web service request was processed by the target web service-related element.

16. The computer program product according to claim 15 wherein the computer-readable program code is configured to identify one of a return value and an exception value of the target web service-related element.

17. The computer program product according to claim 15 wherein statically analyzing comprises statically analyzing multiple web service-exposed application programming interfaces (APIs).

18. The computer program product according to claim 15 wherein statically analyzing comprises statically analyzing the web service-exposed API that contains logic embodying a core function of a business application.

19. The computer program product according to claim 15 wherein statically analyzing comprises statically analyzing a Service Oriented Architecture (SOA) interceptor that relates to one of authentication, authorization, and session management.

20. The computer program product according to claim 15 wherein statically analyzing comprises statically analyzing the web service-exposed API and a Service Oriented Architecture (SOA) interceptor.

21. The computer program product according to claim 15, wherein the computer-readable program code is configured to:
in response to determining that at least a portion of the response matches a characteristic of output of an Service Oriented Architecture (SOA) interceptor from among the plurality of SOA interceptors, identify the SOA interceptor from among the plurality of SOA interceptors as having prevented the web service request from reaching the target web service-related element.

* * * * *